(12) United States Patent
Andrews

(10) Patent No.: US 8,356,242 B2
(45) Date of Patent: *Jan. 15, 2013

(54) COMPUTER PROGRAM PRODUCT AND COMPUTER SYSTEM FOR PRESENTING A SUMMARY OF SELECTED VALUES

(75) Inventor: Gregory Paul Andrews, Rochester, MN (US)

(73) Assignee: SAP AG, Walldorf (DE)

( * ) Notice: Subject to any disclaimer, the term of this patent is extended or adjusted under 35 U.S.C. 154(b) by 710 days.

This patent is subject to a terminal disclaimer.

(21) Appl. No.: 12/352,081

(22) Filed: Jan. 12, 2009

(65) Prior Publication Data

US 2009/0119271 A1 May 7, 2009

Related U.S. Application Data

(63) Continuation of application No. 10/777,833, filed on Feb. 12, 2004, now Pat. No. 7,478,317.

(51) Int. Cl.
*G06F 17/10* (2006.01)
*G06F 17/11* (2006.01)
*G06F 17/21* (2006.01)
*G06F 17/27* (2006.01)
*G06F 3/048* (2006.01)
*G06F 3/14* (2006.01)
*G06F 17/12* (2006.01)
*G06F 17/18* (2006.01)

(52) U.S. Cl. ......... 715/213; 715/209; 715/219; 715/733

(58) Field of Classification Search .................. 715/213, 715/209, 219, 733
See application file for complete search history.

(56) References Cited

U.S. PATENT DOCUMENTS

| | | | |
|---|---|---|---|
| 5,604,854 A | 2/1997 | Glassey | |
| 7,010,779 B2 | 3/2006 | Rubin et al. | |
| 7,117,218 B2 | 10/2006 | Tkashuk et al. | |
| 2002/0036662 A1 | 3/2002 | Gauthier et al. | |
| 2002/0065846 A1 | 5/2002 | Ogawa et al. | |
| 2002/0124016 A1 | 9/2002 | Rank et al. | |
| 2004/0049729 A1 | 3/2004 | Penfield | |
| 2004/0181748 A1 | 9/2004 | Jamshidi et al. | |

OTHER PUBLICATIONS http://www.waterworld.com.hk/ww.accalug.htm, "AC Calc User Guide", Jul. 22, 2004, pp. 1-18.

*Primary Examiner* — Namitha Pillai
(74) *Attorney, Agent, or Firm* — Sterne, Kessler, Goldstein & Fox PLLC

(57) ABSTRACT

A method, system, and article of manufacture for quickly and easily obtaining information about a list of elements. One embodiment of the invention comprises receiving a selection of at least one desired summary function, generating a configuration file containing the at least one desired summary function, receiving a selection of a list of numbers, copying the list of numbers into a clipboard, parsing the configuration file to extract the least one desired function, calculating the at least one desired summary function using the list of desired numbers to generate summary information, displaying the summary information in a pop-up window, and replacing the selected list of numbers with the summary information. The results window may be a pop-window, a hover-help window, or a clipboard.

20 Claims, 5 Drawing Sheets popup configuration file.txt

[Pop Up Configuration]
;Choices for When: immediately, never, hover ←─ 302
304 ─── When=immediately
306 ─── lang=en

[Functions]
312 { 1=Sum
    2=Prod    ←─ 310
    3=Mean
    4=Std
    5=MyFunc

[Sum]
322 ─── DLL=popupFunc.dll    ←─ 320a
324 ─── PROC=Sum
326 ─── en="Sum"
326 ─── es="Suma"

[Prod]
DLL=popupFunc.dll    ←─ 320b
PROC=Product
en="Product"
es="Producto"

[Mean]
DLL=popupFunc.dll    ←─ 320c
PROC=Mean
en="Average"
es="Medio"

[Std]
DLL=popupFunc.dll    ←─ 320d
PROC=Std
en="Std Dev"
es="Desviación De Estándar"

·
·
·

[MyFunc]
DLL=MyFunc.dll
PROC=MyFunc    ←─ 320n
en="My function"
es="Mi función"

COMPUTER PROGRAM PRODUCT AND COMPUTER SYSTEM FOR PRESENTING A SUMMARY OF SELECTED VALUES

CROSS REFERENCE TO RELATED APPLICATION

This is a continuation application of U.S. patent application Ser. No. 10/777,833, filed Feb. 12, 2004, entitled "Method and Apparatus for Presenting a Summary of Selected Values", which is herein incorporated by reference, issued as U.S. Pat. No. 7,478,317.

TECHNICAL FIELD

This invention generally relates to user interface methods and apparatuses. More specifically, the present invention relates to a method and apparatus for displaying a pop-up summary of selected values.

BACKGROUND

The development of the EDVAC computer system of 1948 is often cited as the beginning of the computer era. Since that time, computer systems have evolved into extremely complicated devices. Although today's computers are more sophisticated than EDVAC, the most basic requirements levied upon computer systems have not changed. Now, as in the past, a computer system's job is to access, manipulate, and store information. This fact is true regardless of the type or vintage of computer system.

One of the most commonly encountered types of information is a list of elements, such as a list of numbers. Computer users frequently need to know the statistical properties of the list, such as its sum, average, and standard deviation. One conventional way to determine this information is to first transfer the list into a spreadsheet application, then program the spreadsheet application to calculate the desired properties. One problem with this method is that the user must have access to a spreadsheet application and know how to program it. Another problem with this method is that the transfer and programming steps frequently take a considerable amount of time and effort from the user.

The trend toward pervasive devices, such as cellular telephones and personal digital assistants ("PDAs") further compounds these problems. Many of these devices have limited memory and processing power, and thus do not have a full-featured spreadsheet program. Moreover, even if the pervasive devices did have the capacity to execute a spreadsheet program, the rudimentary data entry capabilities of pervasive devices multiply the time and effort required from the user to transfer the data and program the spreadsheet.

Accordingly, there is a need for a way to quickly and easily obtain statistical information about a list of elements, particularly on pervasive devices.

SUMMARY

The present invention provides a method, system, and article of manufacture that provides a way to quickly and easily obtain information about a list of elements. One aspect of the present invention is a method of displaying customizable summary information about a list of elements. One embodiment of this method comprises receiving a selection of at least one desired summary function, generating a configuration file containing the at least one desired summary function, receiving a selection of a list of numbers, copying the list of numbers into a clipboard, parsing the configuration file to extract the least one desired function, calculating the at least one desired summary function using the list of desired numbers to generate summary information, displaying the summary information in a pop-up window, and replacing the selected list of numbers with the summary information. The results window in some embodiments may be a pop-window, a hover-help window, or the clipboard.

Another aspect of the present invention is a computer program product. One embodiment of this computer program product comprises a program configured to perform a method of displaying summary information about a list of elements and a signal bearing media bearing the program. The method comprises receiving a selection of at least one desired summary function; receiving a selection of a list of elements; calculating the at least one desired summary function using the list of desired elements to generate summary information; and displaying the summary information in a results window. In some embodiments, the program is an operating system, a word processing program, a web browser, or a plug-in.

Yet another aspect of the present invention is a method for transferring information into an application program. One embodiment of this method comprises selecting at least one desired output function, selecting of a list of elements, copying the list of elements into a first addressable memory structure, calculating the at least one desired output function using the list of desired elements to generate output information, and automatically transferring the output information into the application program.

BRIEF DESCRIPTION OF THE DRAWINGS

FIG. 3 depicts one embodiment of a configuration file for information technology system in FIG. 1.

DETAILED DESCRIPTION

Figure 1A:
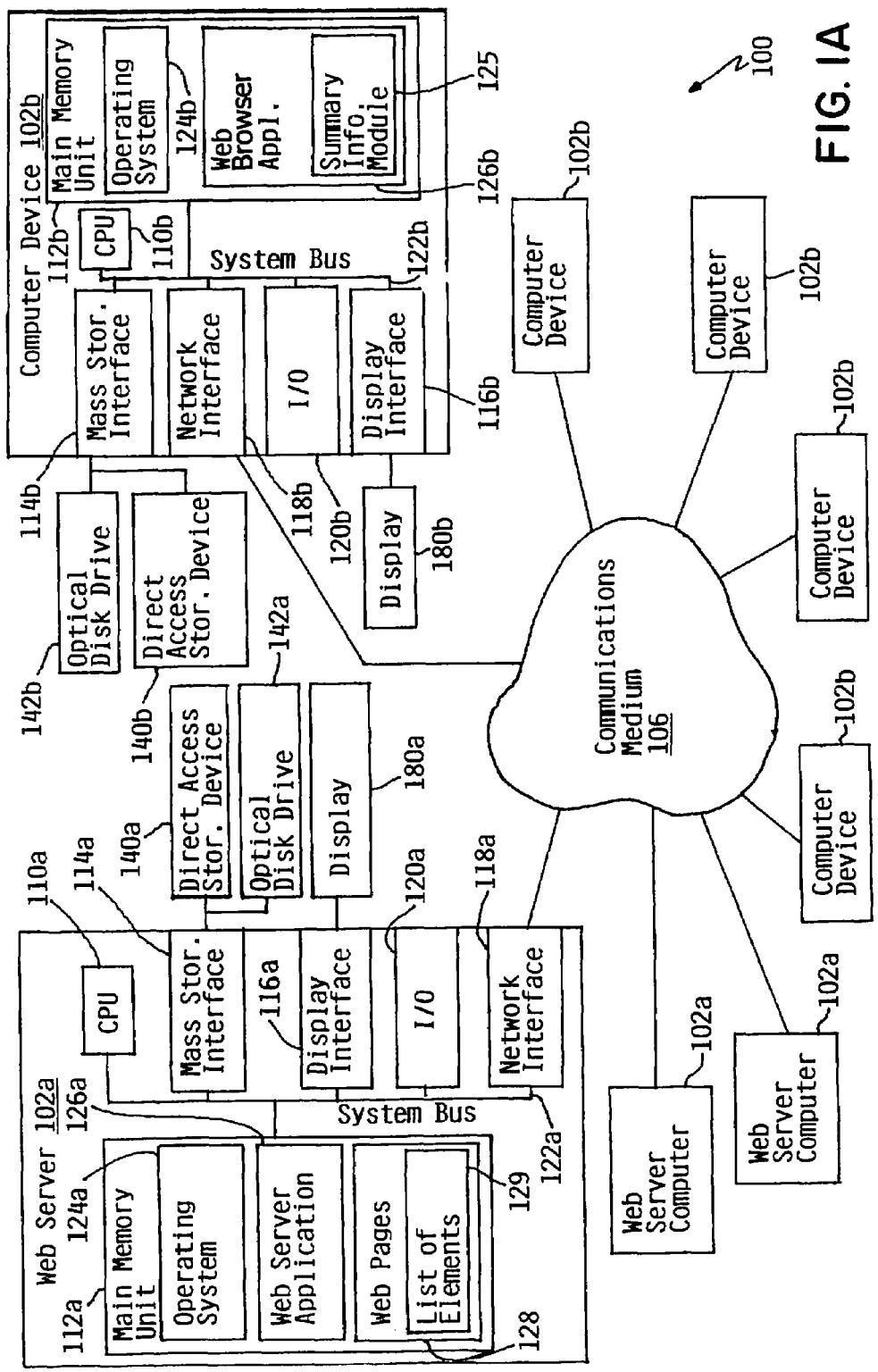
Figs. 1a and 1b depict one embodiment of an information technology system having a configurable summary information calculator.

FIG. 1A depicts one embodiment of an information technology system 100 comprising a plurality of web server computer systems 102a and a plurality of pervasive computing devices 102b (only one web server 102a and device 102b shown in detail for clarity) interconnected by a communications medium 106. Each computer system 102 has one or more central processing units 110 ("CPU") connected to a main memory unit 112, a mass storage interface 114, a display interface 116, a network interface 118, and an input/output ("I/O") interface 120 by a system bus 122. The mass storage interfaces 114 connect the system busses 122 to one or more mass storage devices, such as a direct access storage device 140 and a readable and a writable optical disk drive 142. The network interfaces 118 allow the computer systems 102 to communicate with each other and to a plurality of other computers (not shown) over the communications medium 106. The main memory 112a in the web server computers 102a contains an operating system 124a, and a web server application 126a capable of servicing requests for web pages 128. Some of the web pages 128 contain a list of elements 129. The main memory 112b in the pervasive computing devices 102b contains an operating system 124b and a web browser 126b capable of requesting and rendering the web pages 128 from the web server computer 102a. The web browser 126 in this embodiment includes a summary information module 125 capable displaying summary information about the list of elements 129.

Figure 1B:
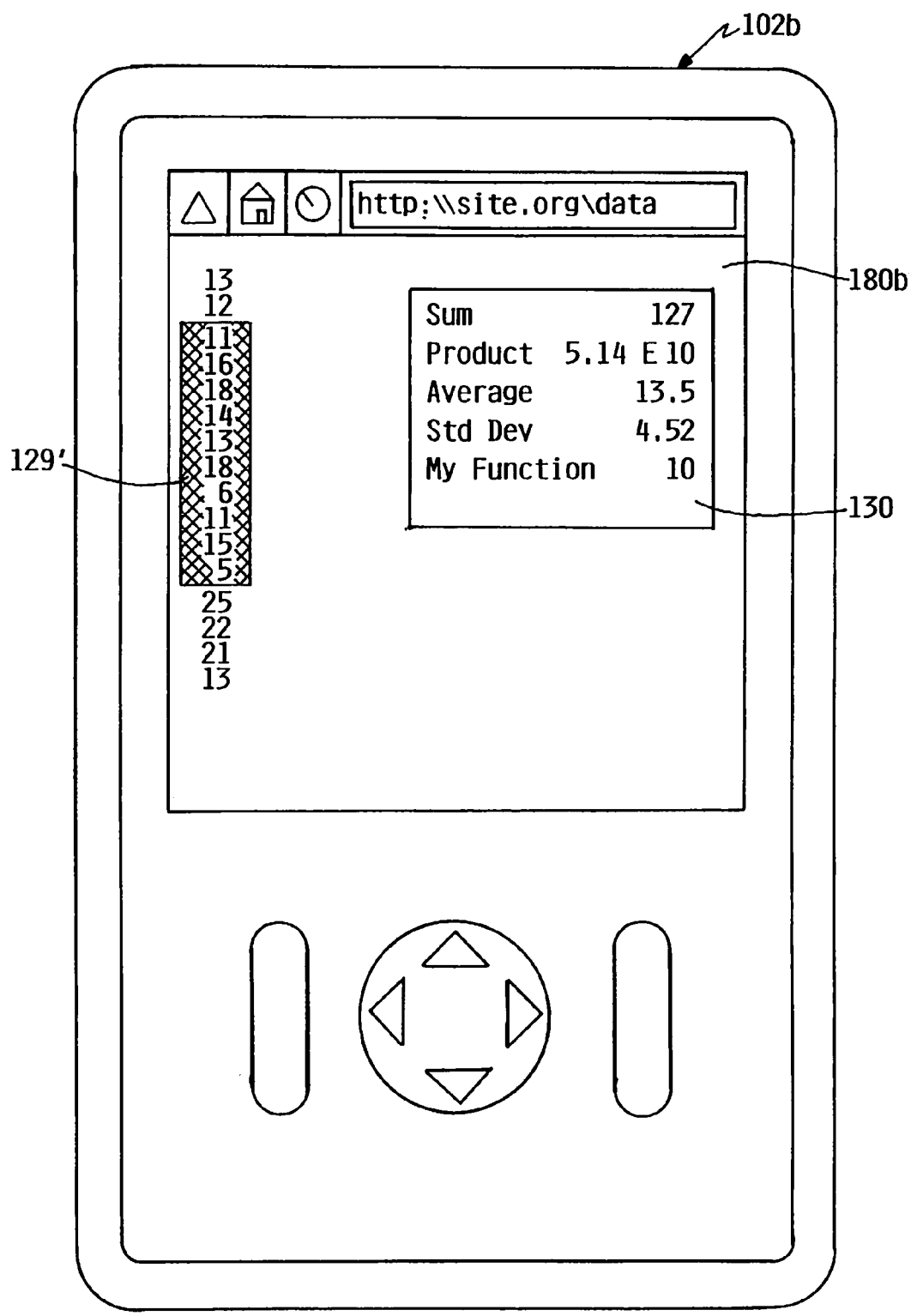

FIG. 1B depicts the pervasive device 102b embodiment in FIG. 1A in more detail. The web browser 126 in this embodiment contains a selected list of elements 129' and results window 130 (e.g., a 'pop-up, 'hover-help,' or 'clipboard' window). In operation, the user of the pervasive device 102b will first request the web pages 128 from the server computer 102a having a list of elements 129, such as a list of numbers. The user then highlights the list of numbers 129' and indicates that they want summary information by, for example, selecting an appropriate command from a context sensitive menu or hovering a mouse pointer over the selected list 129 for a predetermined length of time. In response to this indication, the summary information module 125 copies the list of elements 129' into a temporary memory structure, computes a preselected group of statistics about the elements 129, and then displays the computed statistics in the results window 130.

Figure 2:
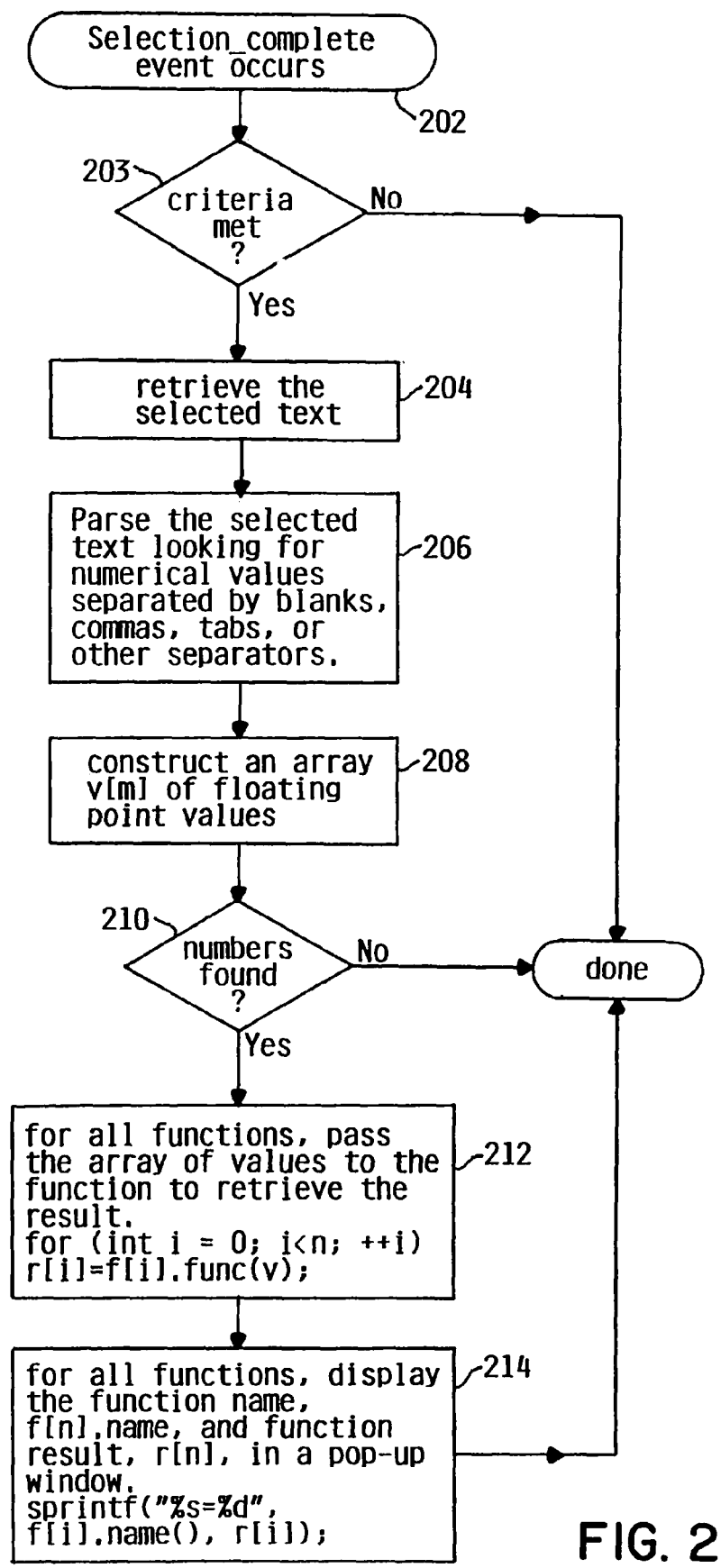
FIG. 2 illustrates the operation of one embodiment of the information technology system in FIG. 1.

FIG. 2 illustrates the operation of one embodiment of the module 125 in more detail. At block 202, the module 125 detects a selection event. This selection event may include any indication that the end user wishes or may wish to view statistics about a list of elements. Suitable selection events include, without limitation, highlighting a list of elements 129 and then hovering over the highlighted list, and highlighting a list of elements 129 and then selecting a menu element from a context sensitive 'right-click' menu. Some embodiments may require that these elements be contiguous, other embodiments will allow the end user to select non-contiguous elements. At block 203, the module 125 confirms that the highlighted text contains a list of elements 129 and that the user has turned 'on' the summary module 125. Next, at block 204, the module 125 copies the highlighted text into an addressable memory structure, such as the clipboard. The operating system 124b then parses the selected text to extract the individual elements of the list 129 at block 206. Part of this process includes looking for blanks, commas, tabs, carriage return commands, or other separators commonly used to separate elements in a list. At block 208, the module 125 will then construct an array containing the elements identified at block 206.

If elements were found at block 208, the module 125 will then determine at block 210 whether all of the values are of the appropriate type. Typically, this test will comprise determining if all the elements in the array are numbers. Next, at block 212, the module 125 passes the array of elements to a list of statistical functions, which each compute the desired statistical datum. The module 125 then displays the name of the function together with its result in a results window at block 214. Some embodiments may also replace list of elements 129 in the clipboard with a table containing the function name(s) and result(s). These embodiments may be desirable because the statistical information can then be easily "pasted" into another application, such as a word processing program.

Figure 4:
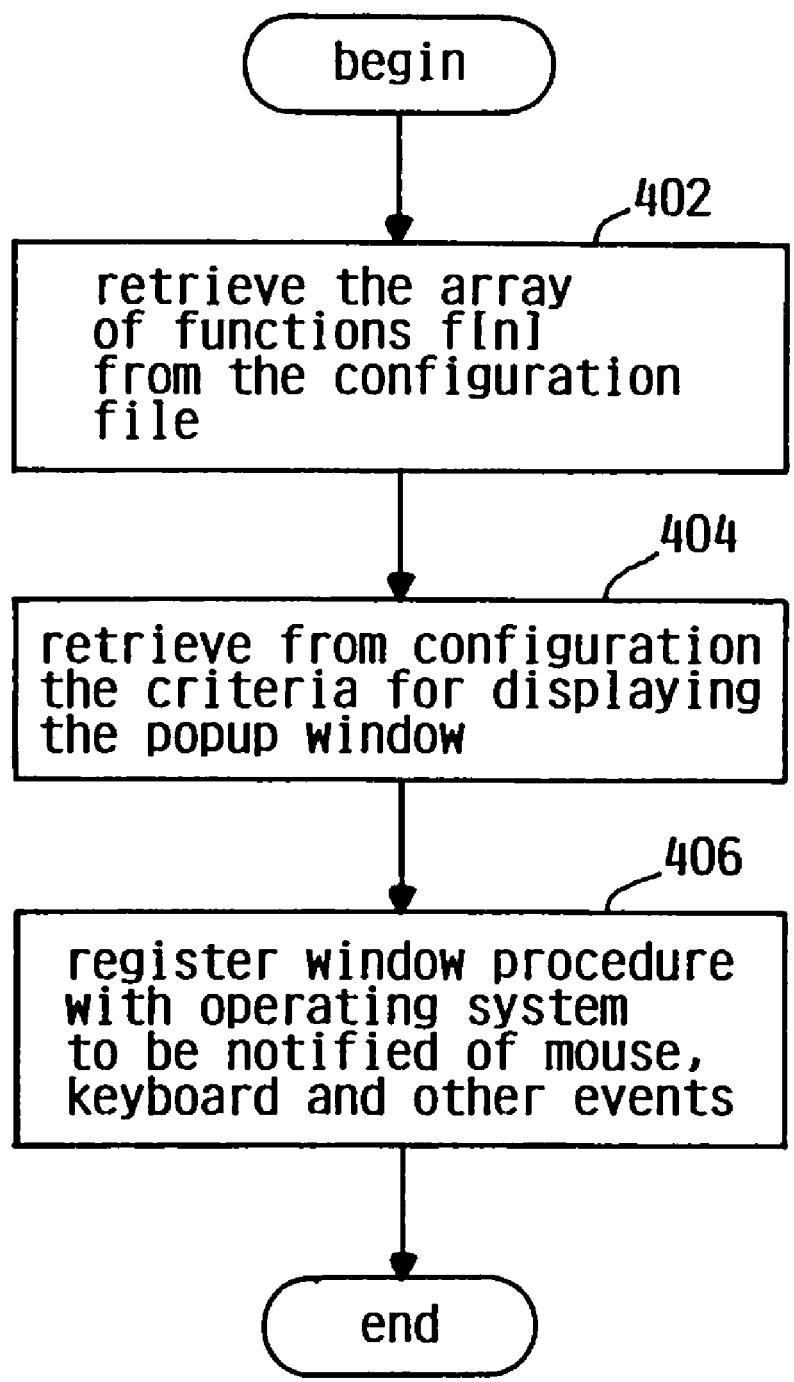
FIG. 4 illustrates one method of configuring the information technology system in FIG. 1.

FIGS. 3-4 illustrate one embodiment of a method for customizing the statistical functions computed by the present invention. More specifically, FIG. 3 illustrates one embodiment of a configuration file 300 for the module 125 shown in FIG. 2. This configuration file embodiment 300 comprises a global configuration section 302, a function list section 310, and a plurality of function configuration sections 320a-320n. The global configuration section 302 contains a timing field 304 specifying when the user wishes the module 125 to display the computed results (e.g., immediately after highlighting the selection, after hovering for a predetermined amount of time, after triggering a particular sequence of keys, or even never), and a language field 306 specifying what language the calculator should display the function names. The function list section 310 contains a list 312 of what functions the module 125 should display. The function configuration sections 320 (only one shown in detail for clarity) each contain a library name field 322 describing what library contains the code that will compute the function, a function name field 324 containing program name of the function in the library 322, and at least one display user name field 326 containing a plain-text name of the function in a particular language.

FIG. 4 illustrates a method of initializing the module 125. At block 402, the module 125 retrieves the list of functions 312 from the configuration file 300. The module 125 then retrieves the display timing criteria from the timing field 304 at block 404. Next, at block 406, the module 125 registers itself to the operating system 124b as a window procedure, which allows it to be notified of any relevant mouse and keyboard events. The module 125 then proceeds to perform the operations described in more detail with reference to FIG. 2.

Referring again to FIG. 1, the computer systems 102 in this embodiment are general-purpose programmable computing devices. Accordingly, the central processing units 110 may be any device capable of executing the program instructions stored in main memory 112, and may be constructed from one or more microprocessors and/or integrated circuits. In this embodiment, when one of the computer systems 102 start up, the associated CPU 110 initially executes the program instructions that make up the operating system 124, which manages the physical and logical resources of the computer system 102. These resources include the central processing unit 110, the main memory 112, the mass storage interface 114, the display interface 116, the network interface 118, and the system bus 122. Moreover, although each computer system 102 in FIG. 1 is shown with only a single processing unit 110 and a single system bus 122, those skilled in the art will appreciate that the present invention may be practiced using a computer system 102 that has multiple processing units 110 and/or multiple system buses 122. In addition, the interfaces 114, 116, 118, and 120 may each include their own separate, fully programmed microprocessors, which may be used to off-load compute-intensive processing from the main processing units 110.

The main memory 112 and the storage devices 140, 142 may be any system capable of storing and retrieving data for the central processing units 110. These systems may utilize virtual addressing mechanisms that allow the computer systems 102 to behave as if they only have access to a large, single storage entity instead of access to multiple, smaller storage entities such as main memory 112 and DASD device 140. Therefore, while the operating systems 124, the web server application 126a, the web browser application 126b, and the web pages 128 are shown to reside in main memory 112, those skilled in the art will recognize that these items are not necessarily all completely contained in main memory 112 at the same time, and may even reside in the virtual memory of other computer systems coupled to the computer system 102.

The display interface 116 is used to directly connect one or more display units 180 to the computer system 102. These display units 180 may be non-intelligent (i.e., dumb) terminals, such as a cathode ray tube, or may themselves be fully programmable workstations used to allow IT administrators and users to communicate with one or more of the computer systems 102. Note, however, that while the display interface 116 is provided to support communication with one or more displays 180, the computer systems 102 does not necessarily require a display 180 because all needed interaction with users and other processes may occur via network interface 118.

The communication medium 106 can be any device or system that allows the computer systems 102 to communicate with each other. The network interfaces 118, accordingly, can be any device that facilitates such communication, regardless of whether the network connection is made using present-day analog and/or digital techniques or via some networking mechanism of the future. Suitable communication mediums 106 include, but are not limited to, the Internet, intranets, cellular transmission networks, wireless networks using one of the IEEE 802.11 specifications, and the like. Those skilled in the art will appreciate that many different network protocols can be used to implement the communication medium 106. The Transmission Control Protocol/Internet Protocol ("TCP/IP") is an example of a suitable network protocol for Internet-based communication.

The embodiment described with reference to FIGS. 1-4 generally uses a client server network architecture. These embodiments are desirable because the pervasive device 102b can utilize the services of the web server computers 102a without either computer system 102 requiring knowledge of the working details about the other. However, those skilled in the art will appreciate that other network architectures are within the scope of the present invention. Examples of other suitable network architectures include peer-to-peer architectures, grid architectures, and multi-tier architectures. Accordingly, the terms web server and client computer should not be construed to limited the invention to client-server network architectures.

One suitable web server computer 102a is an eServer iSeries computer running the OS/400 multitasking operating system, both of which are produced by International Business Machines Corporation of Armonk, N.Y. One pervasive device 102b is a mobile telephone running an embedded Linux or Windows operating systems. However, those skilled in the art will appreciate that the mechanisms and apparatus of the present invention apply equally to any computer system 102 and operating system 124, regardless of whether one or both of the server computer 102a and pervasive devices 102b are complicated multi-user computing apparatuses, a single workstations, lap-top computers, mobile telephones, personal digital assistants ("PDAs"), video game systems, or the like.

Although the present invention has been described in detail with reference to certain examples thereof, it may be also embodied in other specific forms without departing from the essential spirit or attributes thereof. For example, those skilled in the art will appreciate that the present invention is capable of being distributed as a program product in a variety of forms, and applies equally regardless of the particular type of signal bearing media used to actually carry out the distribution. Examples of suitable signal bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive, a CD-R disk, a CD-RW disk, or hard-disk drive); or (iii) information conveyed to a computer by a communications medium, such as through a computer or telephone network, including wireless communications, and specifically includes information downloaded from the Internet and other networks. Such signal-bearing media, when carrying computer-readable instructions that direct the functions of the present invention, represent embodiments of the present invention. In addition, those skilled in the art will also appreciate that the present invention is not limited to pervasive devices.

The present invention could also be implemented at a number of different logical layers within the pervasive device 102b. For example, the functionality described with reference to FIGS. 1-4 could be embodied as part of the operating system 124b. These embodiments may be desirable because applications running on the operating system 124b can provide this functionality without needing to know about the existence and operation of the module 125. The functionality could also be included as a plug-in or extension for an existing application.

The present invention can also be used for purposes other than calculating standard statistical information about a list of elements. For example, the present invention and its customizable output could be used to transfer information from a database or log file into an application program. In these embodiments, the user would customize the API 125 to output the information in the application's desired format, and then simply "cut and paste" the formatted information into the application program The accompanying figures and this description depicted and described embodiments of the present invention, and features and components thereof. Those skilled in the art will appreciate that any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Therefore, it is desired that the embodiments described herein be considered in all respects as illustrative, not restrictive, and that reference be made to the appended claims for determining the scope of the invention.

I claim:

1. A computer program product, comprising:
a program configured to perform a method of displaying customizable summary information about a list of elements, comprising:
receiving a selection of at least one desired summary function;
generating a configuration file containing the at least one desired summary function;
receiving notification of a selection event in a web browser, the selection event comprising a user identifying a portion of a web page comprising a plurality of numbers;
in response to the selection event, automatically:
copying the portion of the web page into a clipboard;
parsing the configuration file to extract the at least one desired summary function;
extracting the numbers from the web page;
calculating the at least one desired summary function using the extracted numbers to generate summary information;
displaying the summary information in a results window; and
replacing the portion of the web page in the clipboard with the summary information; and
a computer-readable storage media bearing the program.

2. The computer program product of claim 1, wherein the computer-readable storage media comprises a memory of a pervasive device.

3. The computer program product of claim 1, wherein the plurality of numbers in the web page are non-contiguous.

4. The computer program product of claim 3, wherein the selection event comprises highlighting textual material that contains the plurality of numbers and at least one separator.

5. The computer program product of claim 3, wherein extracting the numbers from the portion of the web page comprises:
   parsing the selected material to identify the at least one separator; and
   removing the at least one separator from the list of elements.

6. The computer program product of claim 1, wherein the results window is selected from a group comprising a pop-up window and a hover help window.

7. The computer program product of claim 1, wherein the configuration file comprises at least one field chosen from a group comprising a library name, a function name field, and a display name field.

8. The computer program product of claim 1, further comprising registering a window procedure with an operating system.

9. A computer program product, comprising:
   a program configured to perform a method of displaying summary information about a list of elements, comprising:
      parsing a configuration file to extract at least one desired summary function;
      receiving notification of a selection event, the selection event comprising a user identifying in a web browser executing on a computing system a portion of a web page, wherein the portion of the web page comprises a list of elements;
      in response to the selection event, automatically:
         copying the portion of the web page into a clipboard;
         parsing the configuration file to extract the at least one desired summary function;
         extracting the elements from the portion of the web page;
         calculating the at least one desired summary function using the extracted elements to generate summary information;
         displaying the summary information in a results window; and
         replacing the portion of the web page in the clipboard with the summary information; and
   a computer-readable storage media bearing the program.

10. The computer program product of claim 9, wherein identifying the list of elements in the portion of the web page comprises highlighting textual material that contains the list of elements and at least one separator.

11. The computer program product of claim 10, wherein extracting the elements from the portion of the web page comprises:
   parsing the textual material to identify the at least one separator; and
   removing the at least one separator from the list of elements.

12. The computer program product of claim 11, wherein the elements in the list are non-contiguous.

13. The computer program product of claim 9, wherein the results window comprises a pop-up window.

14. The computer program product of claim 9, wherein the results window comprises a hover help window.

15. The computer program product of claim 9, wherein the configuration file comprises at least one field chosen from a group comprising a library name, a function name field, and a display name field.

16. The computer program product of claim 9, further comprising registering a window procedure with an operating system.

17. A computer system, comprising:
   a processing unit;
   a system memory coupled to the processing unit through a system bus;
   a program executed from the system memory by the processing unit, wherein the program is configured to perform a method of displaying customizable summary information about a list of elements, comprising:
      receiving a selection of at least one desired summary function;
      generating a configuration file containing the at least one desired summary function;
      receiving notification of a selection event in a web browser, the selection event comprising a user identifying a portion of a web page comprising a plurality of numbers;
      in response to the selection event, automatically:
      copying the portion of the web page into a clipboard;
      parsing the configuration file to extract the least one desired summary function;
      extracting the numbers from the web page;
      calculating the at least one desired summary function using the extracted numbers to generate summary information;
      displaying the summary information in a pop-up window; and
      replacing the portion of the web page in the clipboard with the summary information.

18. The computer system of claim 17 wherein the program comprises an operating system.

19. The computer system of claim 17, wherein the program comprises a web browser.

20. The computer system of claim 17, wherein the program comprises a browser plug-in.

* * * * *